United States Patent [19]

Fazzina et al.

[11] Patent Number: 5,007,526
[45] Date of Patent: Apr. 16, 1991

[54] CONVEYOR CURVE AND LIVE ROLLER, LINE SHAFT CONVEYOR SYSTEM INCORPORATING SAME

[75] Inventors: Francis P. Fazzina, Grand Rapids; Guy G. Hollister, Spring Lake, both of Mich.

[73] Assignee: ERMANCO Incorporated, Spring Lake, Mich.

[21] Appl. No.: 417,290

[22] Filed: Oct. 5, 1989

[51] Int. Cl.⁵ .............................................. B65G 13/02
[52] U.S. Cl. .................................................... 198/787
[58] Field of Search ........................ 198/787, 789, 790

[56] References Cited

U.S. PATENT DOCUMENTS

| | | |
|---|---|---|
| 732,519 | 6/1903 | Claypool . |
| 871,340 | 11/1907 | Hrdina . |
| 1,191,403 | 7/1916 | Crocker . |
| 1,271,590 | 7/1918 | Lefever . |
| 1,422,817 | 7/1922 | Beers et al. . |
| 1,440,536 | 1/1923 | Gill . |
| 1,650,037 | 11/1927 | Phillips et al. . |
| 1,673,283 | 6/1928 | Hatton . |
| 1,756,653 | 4/1930 | McArthur . |
| 1,846,390 | 2/1932 | Groth . |
| 1,959,157 | 5/1934 | Eggleston . |
| 1,967,747 | 7/1934 | Eggleston . |
| 1,975,927 | 10/1934 | Cushman . |
| 2,001,773 | 5/1935 | Collar . |
| 2,016,700 | 10/1935 | Anderson . |
| 2,055,053 | 9/1936 | Stokes . |
| 2,129,510 | 9/1938 | Taylor . |
| 2,158,482 | 5/1939 | Maltby . |
| 2,622,720 | 12/1952 | Lorig . |
| 2,624,445 | 1/1953 | Wallman . |
| 2,836,284 | 5/1958 | Gilliatt . |
| 3,026,993 | 3/1962 | Penn . |
| 3,170,562 | 2/1965 | Eyster . |
| 3,189,161 | 6/1965 | Schneider et al. . |
| 3,275,124 | 9/1966 | Lutes et al. . |
| 3,337,023 | 8/1967 | Kohl et al. . |
| 3,369,646 | 2/1968 | Musser . |
| 3,507,379 | 4/1970 | Johnston . |
| 3,610,404 | 10/1971 | Fleischauer et al. . |
| 3,826,351 | 7/1974 | Fromme . |
| 4,143,756 | 3/1979 | Chorlton ............................ 198/787 |
| 4,572,447 | 2/1986 | Raasch ............................... 198/787 |
| 4,685,556 | 8/1987 | Joseph ............................... 198/787 |

*Primary Examiner*—Joseph E. Valenza
*Attorney, Agent, or Firm*—Lockwood, Alex, FitzGibbon & Cummings

[57] ABSTRACT

A curve unit for live roller line shaft conveyor systems is described. In a preferred embodiment, the curve unit includes a curve segment with driven rollers powered by a drive disc and a pair of straight segments with driven rollers powered by a pair of drive shafts through the use of elastomeric belts. The unit may be incorporated in a live roller, line shaft conveyor system with all of the driven rollers powered by a single drive motor. Alternatively, the curve unit may be driven by a dedicated drive motor. An annular lip is provided on the disc drive to frictionally engage the bottom surfaces of the conveyor rollers in the curve segment so that rotation of the drive disc about its vertical axis also drives the rollers in the curve segment. The described arrangement of parts provides for synchronous rotation of driven rollers in both the curved segment and the adjoining segments of the curve unit as well as the driven rollers in the conveyor system.

24 Claims, 5 Drawing Sheets

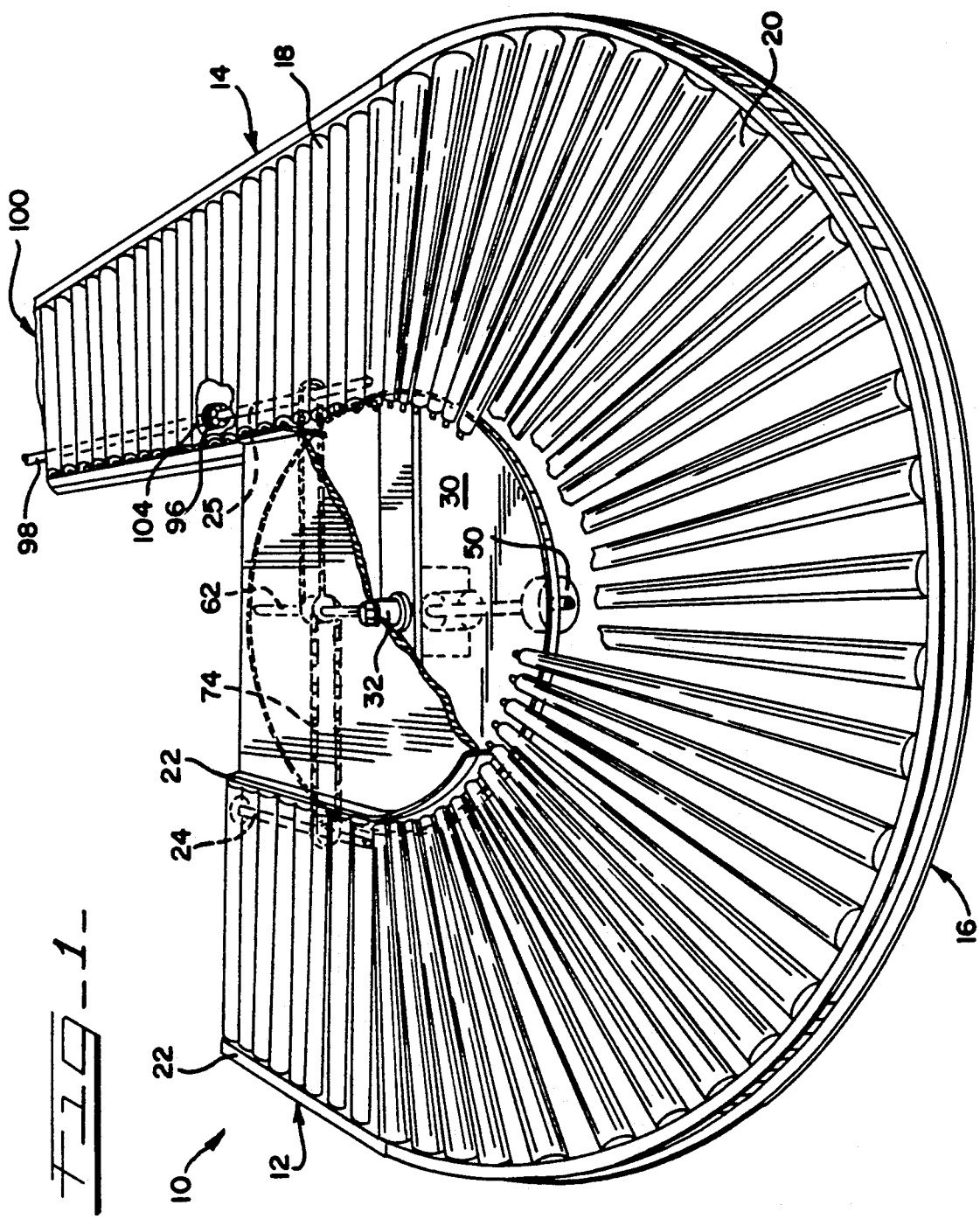

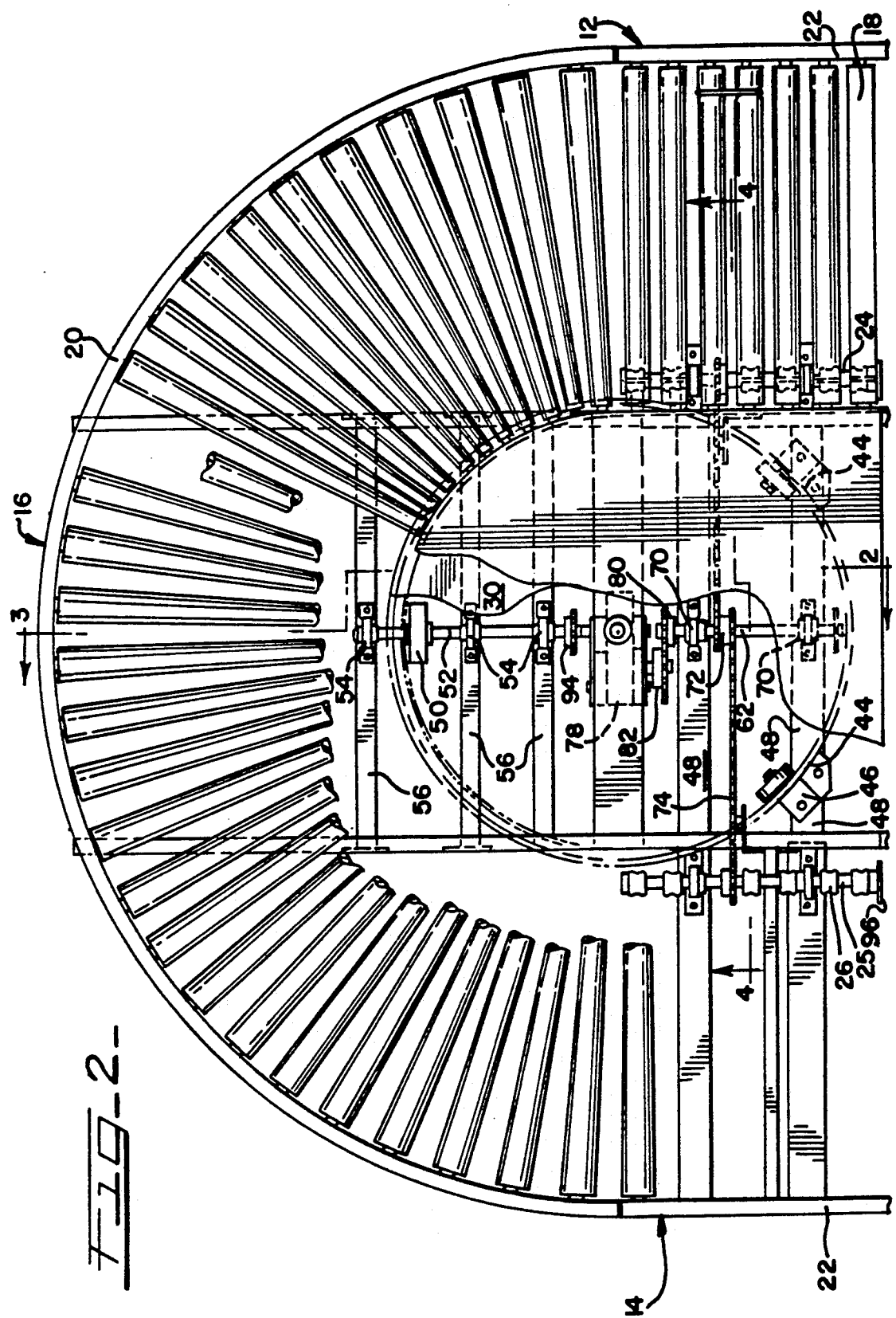

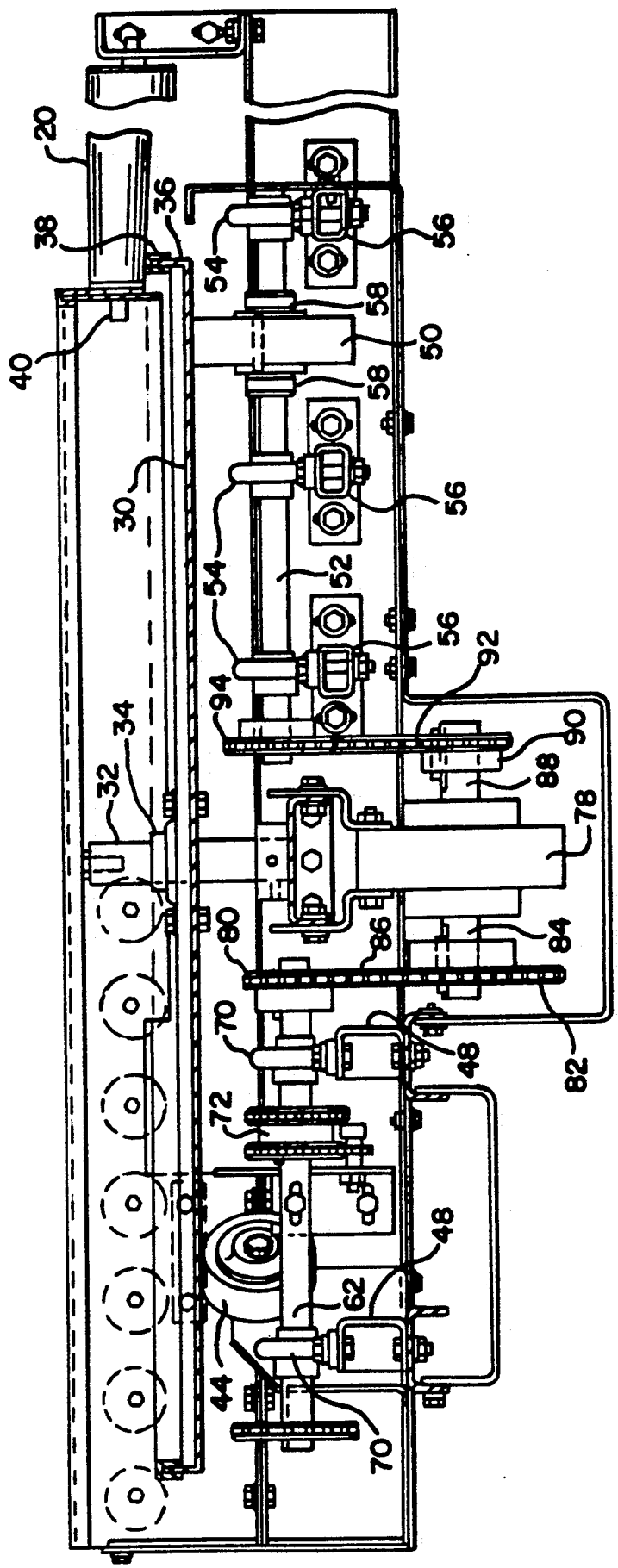
FIG-3-

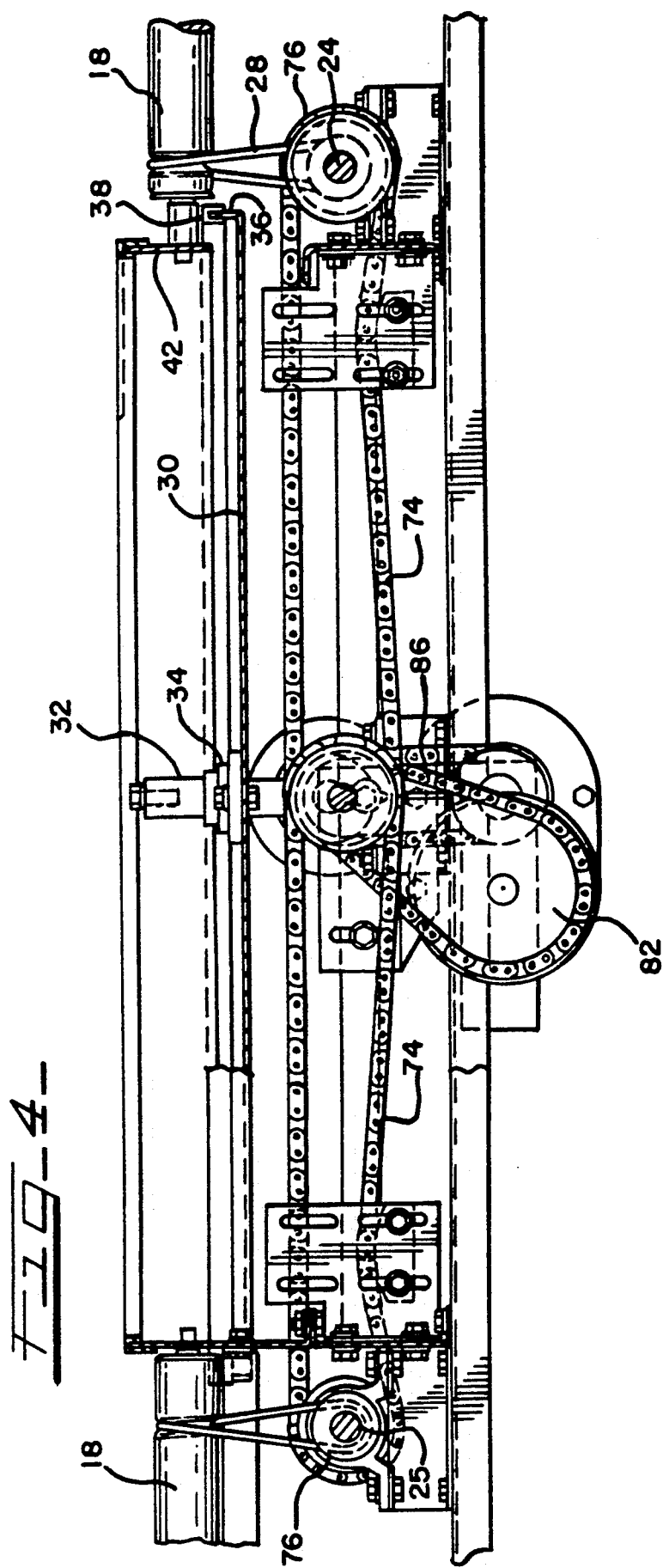

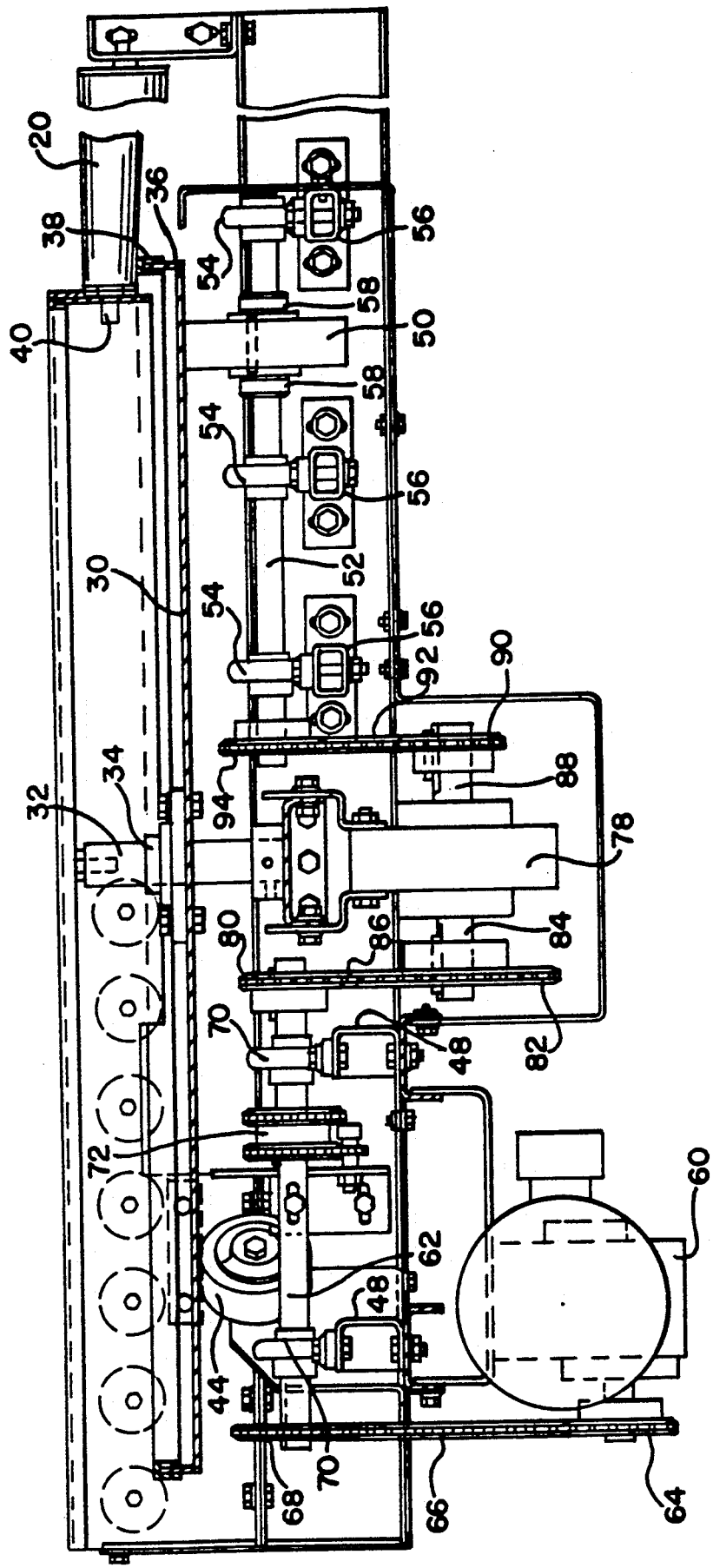

CONVEYOR CURVE AND LIVE ROLLER, LINE SHAFT CONVEYOR SYSTEM INCORPORATING SAME

BACKGROUND AND BRIEF DESCRIPTION OF THE INVENTION

The present invention generally relates to novel and improved curves for live roller, line shaft conveyor systems and to such line shaft conveyor systems which include these novel and improved curves. More particularly, this invention is directed to disc-driven curves for line shaft conveyors which are optionally powered by a common motor drive that powers the entire conveyor system or a dedicated motor-drive. In this regard, an important aspect of the present invention concerns a live roller, line shaft conveyor which includes a novel 180 degree curve segment of driven conveyor rollers wherein the driven rollers in the curve segment are powered by a disc drive.

Various means have been employed in the past for driving rollers around a curve in a line shaft conveyor system. One such means involves the use of a segmented drive shaft to drive the rollers along the associated straight sections of the conveyor system as well as around the 180 degree curve. Such a drive shaft has generally been constructed by including a series of universal joints and segments of drive shaft to provide the curvature required for the shaft to conform to the specific curve of the conveyor system. As such, these universal-joint curves generally require relatively large amounts of floor space, particularly where a 180 degree curve is employed in the conveyor system. Another arrangement for driving the conveyor rollers in a curve of a live roller, line shaft conveyor system involves the use of sprockets and chains which are costly to manufacture and maintain and which also generally limit the allowable inside radius of the curve segment.

The present invention overcomes these and other problems of the prior art by providing a live roller, line shaft conveyor system which incorporates a novel curve segment of driven conveyor rollers wherein an associated disc drive powers the rollers in the curve. In the embodiments described herein, segments of driven rollers in a live roller, line shaft conveyor system may be connected through a 180 degree or lesser curve segment of driven rollers. The rollers are driven along the curved portion by a disc drive which frictionally engages the underside of each of the driven rollers along the curve. In the preferred embodiment, the disc drive is provided with an annular lip extending upward from the disc along the outermost edge thereof. The disc drive is positioned underneath the rollers on the curve so that the annular lip of the disc frictionally engages the underside of each of the associated conveyor rollers. Adjoining straight segments of driven rollers on the curve unit are driven by drive shafts extending underneath along the length of each adjoining straight segment and perpendicular to the rollers. Each of these drive shafts may generally be connected to the associated driven rollers by elastomeric O-ring drive belts in a manner known to those skilled in the art. In a first preferred embodiment, the drive shafts of the straight portions in the curve unit are operatively connected to the drive shafts in the live roller, line shaft conveyor system thereby enabling the entire system, including the curve, to be powered by a common drive motor. In a second preferred embodiment, the curve unit is powered by a dedicated drive motor.

Live roller, line shaft conveyor systems which incorporate this invention can have a 180 degree curve with an inside radius which is significantly smaller than is possible with conventional conveyor curve arrangements. Additionally with this invention, the rollers in the curve and other portions of the system are able to be driven synchronously with each other.

Accordingly, it is an object of the present invention to provide a live roller, line shaft conveyor system having an improved curve unit.

Another object of the present invention is to provide a curve unit for a live roller, line shaft conveyor which affords optimum floor space savings.

Another object of the present invention is to provide a powered live roller curve unit for a live roller, line shaft conveyor which enables product flow on such curve at the same speed as that of adjoining sections of the conveyor system.

Another object of the present invention is to provide a disc drive for a live roller, line shaft conveyor system wherein the disc drive powers the driven conveyor rollers around a 180 degree curve.

Another object of the present invention is to provide a live roller, line shaft conveyor system which includes a minimum radius 180 degree curve.

The aforementioned objects along with various other objects, features and advantages of the present invention will be better appreciated by those skilled in the art upon further consideration of the remainder of the disclosure including the detailed description of the preferred embodiments, the claims, and the drawings.

BRIEF DESCRIPTION OF THE DRAWINGS

FIG. 1 is a perspective view of a portion of a live roller, line shaft conveyor system according to the present invention;

FIG. 2 is a top plan view, partially cut away, of the live roller, line shaft conveyor system of FIG. 1;

FIG. 3 is a sectional side elevational view of the live roller, line shaft conveyor system of FIG. 2 and taken along the 3—3 line thereof;

FIG. 4 is a sectional elevational view of the live roller, line shaft conveyor system of FIG. 2 and taken along the 4—4 line thereof; and, FIG. 5 is a sectional side elevational view of a second embodiment of a portion of the live roller, line shaft conveyor system of the present invention.

DETAILED DESCRIPTION OF THE PREFERRED EMBODIMENTS

The present invention is generally directed to a live roller, line shaft conveyor system for conveying articles thereon and which incorporates a tight radius curve segment along the conveyor line. As such, this invention finds particularly advantageous application in live roller, line shaft conveyor systems that include a 180 degree curve and which require minimum floor space for such curve. The conveyor rollers along the conveyor curve segment are preferably driven by a disc drive mounted as the interior of the curve and positioned for frictional engagement with the underside of each of the conveyor rollers in the curve. The curve unit includes short straight segments of driven rollers wherein the rollers in these straight segments are driven by drive shafts mounted thereunder along the straight segment length and perpendicular to each roller. The conveyor rollers in these segments are typically connected to the respective drive shafts associated therewith by elastomeric O-ring drive belts. As such, the use of this curve unit in the live roller, line shaft conveyor systems enables efficient use of available space. For example, a 180 degree curve having a minimum radius of approximately 9 inches and an 18 inch spacing between the straight conveyor sections which feed to and from the curve can be achieved in conveyor systems which employs rollers having a length of 15⅞ inches or more.

Referring now to the various figures, a live roller line shaft conveyor system is shown which, in accordance with an important aspect of the present invention, includes a minimum radius 180 degree curve. The curve unit 10 includes a lefthand straight conveyor section 12 and a righthand straight conveyor section 14. The right segment 14 and the left segment 12 are preferably provided as parallel straight segments of conveyor rollers adjoining a conveyor curve segment 16, substantially as shown in FIG. 2. The parallel straight segments 12 and 14 are substantially identical and generally include a plurality of parallel conveyor rollers 18 mounted transversely between parallel frame members 22. Tapered conveyor rollers 20 are provided along the curve segment 16. As will be appreciated by those skilled in the art, the tapered rollers 20 are oriented within the curve segment 16 so that the wide portion of each tapered roller 20 is positioned along the outermost edge of the curved segment 16 with the narrow portion of each roller 20 positioned along the inner arc of the curved segment 16. All of the rollers, both straight rollers 18 and tapered rollers 20, are mounted to the respective frame members and along their respective axles for rotation thereon.

The adjoining lefthand and righthand segments 12 and 14, are preferably provided with drive means in the form of identical first and second drive shafts 24 and 25, respectively, which are mounted beneath the rollers 18 and which extend transversely thereunder. Each of the shafts 24 and 25 is connected to the drive rollers 18 by elastomeric O-ring drive belts 28, or the equivalent, for co-rotation of the rollers 18 with the first and second shafts in a manner that is generally known to those skilled in the art. The shafts 24 and 25 may be mounted for axial rotation along one of the frame members 22 or the cross members 48, substantially as shown in FIG. 2. A series of identical pulleys 26 may be disposed along the length of the drive shafts for receiving individual elastomeric O-ring drive belts 28 therein. In this manner, the pulleys 26 are held in power transmitting frictional relationship with the drive shaft by the tension exerted by the O-ring drive belt to thereby provide the frictional relationship needed to transfer the rotational drive from shaft to each of the associated conveyor rollers 18. The means for driving each of the conveyor rollers 18 along conveyor segments 12 and 14 are generally known to those skilled in the art and are commercially available, such as those available through Ermanco Incorporated of Spring Lake, Mich.

In accordance with the present invention, a drive disc 30 is provided to power the tapered rollers 20 around the curved segment 16 in the system 10. The drive disc is mounted on a rotational pivot shaft 32 and is affixed to this shaft in a conventional manner such as by use of a bearing 34, as shown in FIG. 4. The drive disc 30 is provided with an annular lip 36 along the outer perimeter thereof. A rubber or synthetic edge member 38 is preferably provided on the lip 36 for frictional engagement with the bottom surfaces of the tapered rollers 20. The disc 30 is preferably of a diameter which is large enough to extend across the corresponding diameter of the inside arc of the curve segment 16 and, when properly positioned within that arc, will extend beneath the narrow inner portions of the tapered rollers 20. When properly positioned, the lip 36 and the edge member 38 will support the bottom surface of the small end of each tapered roller 20 to provide a frictional contact therebetween. In this preferred arrangement of parts, the rotational drive of the disc 30 around shaft 32 is transferred to all of the tapered rollers 20 along the curved segment 16 to drive the rollers 20. Each axle 40 for each tapered roller 20 is preferably mounted within vertical slots (not shown) provided along the inside frame 42 of curved segment 16 to prevent lateral roller movement while simultaneously allowing the roller to lay directly on edge member 38 of the lip 36.

The outer portion of drive disc 30 is preferably supported by idler wheels 44 positioned underneath the drive disc and positioned outwardly of the shaft 32 near the outer edge of the drive disc 30. As shown in FIG. 2, mounting brackets 46 support each idler wheel 44 which are similarly attached to and supported by crossmember 48 at a distance beneath the drive disc 30 so that each idler wheel 44 can support the drive disc 30 at a height to maintain the frictional contact between lip 36 and each of the tapered rollers 20.

Driving power is provided to the drive disc 30 by a drive wheel 50 which, like the idler wheels 44, is located outwardly of the shaft 32 on the underside of the drive disc 30. In the preferred embodiment, the drive wheel 50 is positioned along a third drive shaft 52 for co-rotation therewith. The drive wheel 50 abuts the underside of the drive disc 30 to spin the drive disc when the wheel 50 is rotated by the third shaft 52. The drive wheel is preferably made of rubber or any other material which will provide a high coefficient of friction when in contact with the metallic surface of a drive disc. The shaft 52 may be mounted for support within bearings 54 which may be affixed to cross-members 56. The drive wheel 50 may be retained between collar members 58 to prevent axial movement of the drive wheel 50 along the shaft 52 during operation. Preferably, the drive wheel 50 and the third drive shaft 52 are operatively associated with first and second shafts 24 and 25 and with the adjoining segments 12 and 14 through a combination of chains, sprockets, shafts and gear box discussed and described below, which provide power to the curved segment 16 and adjoining segments 12 and 14 to synchronously drive the straight and the tapered conveyor rollers 18 and 20.

The curve segment 16 and the adjoining segments 12 and 14 of curve unit 10 may be synchronously driven without the use of additional motors or the like by providing one or both of the identical first and second drive shafts 24 and 25 with an end sprocket 96 for connecting the associated shafts with an adjoining and compatible drive shaft 98 (FIG. 1) which is associated with another segment of conveyor rollers 100 within the system. A comparable end sprocket 104, mounted on the end of shaft 98, may be provided so that a conventional chain coupler can connect the two end sprockets 96 and 104. In this manner, a chain coupler and sprocket connection links the adjoining segments 12 and 14 with other segments in the system so that the drive motor (not shown) for the system synchronously drives the entire system including adjoining segments 12 and 14 as well as the curved segment 16.

In the above-described arrangement of parts, power is transferred from the first and second shafts 24 and 25 to a main drive shaft 62 which extends underneath the disc drive 30 and is mounted along cross-members 48 within bearings 70. A double sprocket 72 is mounted for rotation along the main shaft 62 and a pair of identical chains 74 extend between the double sprocket 72 to receiving sprockets 76 affixed along both of the identical drive shafts 24 and 25. In this manner, rotation of at least one of the first or second drive shafts will drive the main shaft 62 by the rotation of the double sprocket 72 and by virtue of the chain 74 extending between the double sprocket and the receiving sprockets 76.

A gear box 78 is affixed beneath the rotational pivot shaft 32 of the drive-disc 30 to provide for the transfer of rotational power from the main drive shaft 62 to the third drive shaft 52 associated with the drive wheel 50. The gear box 78 is preferably provided as a parallel shaft gear box with counter-rotating shafts 84 and 88. A sprocket 80 is mounted for rotation on the main shaft 62 on the end of the shaft closest to the gear box 78. The sprocket 80 is associated with a second sprocket 82 mounted on a first output shaft 84 extending from the gear box 78. The two sprockets 80 and 82 are connected by a chain 86 which drives the second sprocket 82 on the output shaft 84 to transfer rotational power through the gear box 78 to a second output shaft 88 located on the same side of the gear box as the drive wheel 50 and its associated drive shaft 52. The rotational drive of the second output shaft 88 is transferred from an associated sprocket 90 via chain 92 to a sprocket 94 mounted for rotation on the nearest end of the third shaft 52, substantially as shown in FIG. 3. Rotation of the sprocket 94 will rotate the third shaft 52 and the drive wheel 50 associated therewith to spin the drive 30 about the shaft 32 and to transfer power to the tapered rollers 20 by the frictional fit between the drive disc 30 and the rollers 20.

In an alternate embodiment (FIG. 5), a drive motor 60 may be mounted underneath the main shaft 62 to provide rotational power to each of the first, second and third shafts as well as to the main shaft 62 so that the rollers associated with all three roller segments 12, 14 and 16 rotate synchronously to provide relatively consistent and uniform roller speeds along all three driven roller segments. Where included, only one such drive motor 60 may be needed to synchronously drive the curved segment 16 and the adjoining segments 12 and 14. The relationship of parts described above with regard to the connections between the main shaft 62, the identical drive shafts 24 and 25, the gear box 78 and the third shaft 52 is also applicable to the description of this second or alternate embodiment and will not be repeated. When the use of a motor 60 is required, a motor drive sprocket 64 transfers rotational power from the motor 60 via chain 66 to the shaft sprocket 68 mounted on the main drive shaft 62. Rotational drive is then transferred to the curved segment 16 and to the adjoining segments 12 and 14 from the main shaft 62 via the above-described relationship of parts.

The drive disc 30 of the system provides for a system geometry which allows the curved segment 16 to be provided with an inside radius which is substantially less than curved segments provided in various prior art systems. In the arrangement of parts described herein, the curve segment 16 may typically be provided with an inner radius of as little as 9 inches in conveyor systems which employ rollers which are approximately 16 inches in length or more.

It should be recognized that the above described arrangement of parts may be modified in various ways while still providing a live roller, line shaft conveyor system incorporating a conveyor curve in accordance with the principles of the present invention. It is contemplated that various arrangements of parts are possible for those skilled in the art wherein the exact relationship between the various drive shafts, the gear box and the drive discs are different than the arrangements described above while still falling within the scope of the present invention. For example, the position of gear box 78 may be changed from the above described position underneath the drive disc 30 to a mounted position directly underneath the first or the second drive shaft 24 or 25, respectively. Likewise, when gear box 78 is positioned under the first drive shaft 24, for example, the inter-relationship of parts may be such that the first shaft 24 is drivingly coupled to the third shaft 52 through gear box 78 with the required chain and sprocket connections associated with such an arrangement. In this manner, the main shaft 62 may be eliminated. In such an arrangement, the second drive shaft 25 could also be driven by a direct chain and sprocket connection with either the third shaft 52 or the first shaft 24.

Those skilled in the art will also recognize that the drive wheel 50 may be positioned along the main shaft 62 or at any other convenient location underneath the drive disc 30 as long as the drive disc is properly balanced on bearing 34 so that the drive wheel 50 can provide constant frictional driving force against the underside of the drive disc. In this regard, those skilled in the art will appreciate that various mechanical relationships between the drive shafts, the gear box, and the drive disc are possible and can generally be achieved by the appropriate use of chain and sprocket connections between the above described parts.

While preferred embodiments of the present invention have been discussed and described above, those skilled in the art will appreciate that various changes and modifications may be made thereto without departing from the true spirit and scope of the invention, as defined in the following claims.

We claim:

1. A curve for a live roller, line shaft conveyor system, said curve comprising:

a first segment of driven conveyor rollers, said first segment associated with a first drive shaft for driving said first segment of driven conveyor rollers, said first drive shaft extending transversely beneath said first segment;

a second segment of driven conveyor rollers, said second segment associated with a second drive shaft for driving said second segment of driven conveyor rollers, said second drive shaft extending transversely beneath said second segment;

a curve segment of driven conveyor rollers extending beneath and connecting said first segment and said second segment;

a drive disc for driving said curve segment of driven rollers, said drive disc having an annular lip associated therewith and including an edge member thereon, said edge member being positioned against the bottom surfaces of said curve segment of driven rollers to rotate said driven rollers in said curve segment when said drive disc is rotated;

said drive disc being positioned for rotation within a horizontal plane and supported therein by at least one idler wheel and a drive wheel, said idler wheel and said drive wheel retaining said edge member against the bottom surface of said driven rollers in said curve segment to drive said rollers when said drive disc is rotated within said horizontal plane.

2. The curve of claim 1 wherein the rollers in said curve segment define a substantially 180 degree path of travel for articles which are conveyed thereon.

3. The curve of claim 1 further comprising coupling means associated with said first drive shaft and connecting said first drive shaft to a first associated drive shaft in a live roller, line shaft conveyor system to transfer driving power between said first shaft and said first associated drive shaft.

4. The curve of claim 3 wherein said coupling means consists of a pair of sprockets drivingly connected by a chain, one of said sprockets being mounted adjacent an end of said first drive shaft and the other of said sprockets being mounted near an end of said first associated drive shaft.

5. The curve of claim 1 further comprising coupling means associated with said second drive shaft and connecting said second drive shaft to a second associated drive shaft to transfer driving power between said second shaft and said second associated shaft.

6. The curve of claim 5 wherein said coupling means consists of a pair of sprockets drivingly connected by a chain, one of said sprockets being mounted near an end of said second drive shaft and the other of said sprockets being mounted near an end of said second associated drive shaft.

7. The curve of claim 1 wherein said first drive shaft includes a plurality of pulley members axially positioned therealong, each said pulley member being associated with one of said driven conveyor rollers along said first segment, each said conveyor roller and pulley member having an elastomeric O-belt reeved therearound to retain said pulley member in frictional contact with said first drive shaft for driving said conveyor roller when said first drive shaft is rotated.

8. The curve of claim 1 wherein said second drive shaft includes a plurality of pulley members axially positioned therealong, each said pulley member being associated with one of said driven conveyor rollers along said second segment, each said conveyor roller and pulley member having an elastomeric O-belt reeved therearound to retain said pulley member in frictional contact with said second drive shaft for driving said conveyor roller when said second drive shaft is rotated.

9. The curve of claim 1 wherein said drive wheel is affixed along a third drive shaft, said third drive shaft being operatively associated with at least one of said first and said second drive shafts such that rotation of either said first or said second drive shaft also drives said third drive shaft and said drive wheel.

10. A curve for a live roller, line shaft conveyor system, said curve comprising:
a first segment of driven conveyor rollers, said first segment associated with a first drive shaft for driving said first segment of driven conveyor rollers, said first drive shaft extending transversely beneath said first segment;
a second segment of driven conveyor rollers, said second segment associated with a second drive shaft for driving said second segment of driven conveyor rollers, said second drive shaft extending transversely beneath said second segment;
a curve segment of driven conveyor rollers extending between and connecting said first segment and said second segment; and
a drive disc for driving said curve segment of driven rollers, said drive disc having an annular lip associated therewith and including an edge member thereon, said edge member being positioned against the bottom surfaces of said curve segment of driven rollers to rotate said driven rollers in said curve segment when said drive disc is rotated;
said drive disc being positioned for rotation within a horizontal plane and supported therein by at least one idler wheel and a drive wheel, said idler wheel and said drive wheel retaining said edge member against the bottom surface of said driven rollers in said curve segment to drive said rollers when said drive disc is rotated within said horizontal plane and wherein said drive wheel is affixed along a third drive shaft, said third drive shaft being operatively associated with at least one of said first and said second drive shafts such that rotation of either said first or said second drive shaft also drives said third drive shaft and said drive wheel.

11. The curve of claim 10 wherein said driven conveyor rollers in said curve segment define a substantially 180 degree path of travel for articles which are conveyed thereon.

12. The curve of claim 10 further comprising coupling means associated with said first drive shaft and connecting said first drive shaft to a first associated drive shaft in a live roller, line shaft conveyor system to transfer driving power between said first drive shaft and said first associated drive shaft.

13. The curve of claim 12 wherein said coupling means consists of a pair of sprockets drivingly connected by a chain, one of said sprockets being mounted adjacent an end of said first drive shaft and the other of said sprockets being mounted near an end of said first associated drive shaft.

14. The curve of claim 10 further comprising coupling means associated with said second drive shaft and connecting said second drive shaft to a second associated drive shaft to transfer driving power between said second drive shaft and said second associated drive shaft.

15. The curve of claim 14 wherein said coupling means consists of a pair of sprockets drivingly connected by a chain, one of said sprockets being mounted near an end of said second drive shaft and the other of said sprockets being mounted near an end of said second associated drive shaft.

16. The curve of claim 10 wherein said first drive shaft includes a plurality of pulley members axially positioned therealong, each said pulley member being associated with one of said driven conveyor rollers along said first segment, each said conveyor roller and pulley member having an elastomeric O-belt reeved therearound to retain said pulley member in frictional contact with said first drive shaft for driving said conveyor roller when said first drive shaft is rotated.

17. The curve of claim 10 wherein said second drive shaft includes a plurality of pulley members axially positioned therealong, each said pulley member being associated with one of said driven conveyor rollers along said second segment, each said conveyor roller and pulley member having an elastomeric O-belt reeved therearound to retain said pulley member in frictional contact with said second drive shaft for driving said conveyor roller when said second drive shaft is rotated.

18. A curve for a live roller, line shaft conveyor system, said curve comprising:
- a first segment of driven conveyor rollers, said first segment being associated with a first drive shaft for driving said first segment of driven conveyor rollers, said first drive shaft extending transversely beneath said first segment;
- a second segment of driven conveyor rollers, said second segment being associated with a second drive shaft for driving said second segment of driven conveyor rollers, said second drive shaft extending transversely beneath said second segment;
- a curve segment of driven conveyor rollers extending between and connecting said first segment and said second segment said curve segment defining a substantially 180 degree path of travel for articles which are conveyed;
- a drive disc for driving said curve segment of driven rollers, said drive disc having an annular lip associated therewith and including an edge member thereon, said edge member being positioned against the bottom surfaces of said curve segment of driven rollers to rotate said driven rollers in said curve segment when said drive disc is rotated;
- said drive disc being positioned for rotation within a horizontal plane and supported therein by at least one idler wheel and a drive wheel, said at least one idler wheel and said drive wheel retaining said edge member against the bottom surface of said driven rollers in said curve segment to drive said rollers when said drive disc is rotated within said horizontal plane by said drive wheel; and
- a drive motor operatively associated with each of said first drive shaft, said second drive shaft and said drive disc to thereby drive each of said first segment, said second segment and said curve segment.

19. The curve of claim 18 wherein said first drive shaft includes a plurality of pulley members axially positioned therealong, each said pulley member being associated with one of said driven conveyor rollers along said first segment, each said conveyor roller and pulley member having an elastomeric O-belt reeved therearound to retain said pulley member in frictional contact with said first drive shaft for driving said conveyor roller when said first drive shaft is rotated.

20. The curve of claim 18 wherein said second drive shaft includes a plurality of pulley members axially positioned therealong, each said pulley member being associated with one of said driven conveyor rollers along said second segment, each said conveyor roller and pulley member having an elastomeric O-belt reeved therearound to retain said pulley member in frictional contact with said second drive shaft for driving said conveyor roller when said second drive shaft is rotated.

21. The curve of claim 18 wherein said drive disc is drivingly associated with a third drive shaft, said third drive shaft being operatively associated with said first drive shaft and said second drive shaft such that rotation of any one of said drive shafts also drives the remaining two said drive shafts said third drive shaft including said drive wheel affixed therealong for rotationally driving said drive disc under the power of said drive motor.

22. A curve for a live roller, line shaft conveyor system, said curve comprising:
- a first segment of driven conveyor rollers, said first segment being associated with a first drive shaft for driving said first segment of driven conveyor rollers, said first drive shaft extending transversely beneath said first segment;
- a second segment of driven conveyor rollers, said second segment being associated with a second drive shaft for driving said second segment of driven conveyor rollers, said second drive shaft extending transversely beneath said second segment;
- a curve segment of driven conveyor rollers extending between and connecting said first segment and said second segment, said curve segment defining a substantially 180 degree path of travel for articles which are conveyed thereon;
- a drive disc for driving said curve segment of driven rollers, said drive disc having an annular lip associated therewith and including an edge member thereon, said edge member being positioned against the bottom surfaces of said curve segment of driven rollers to rotate said driven rollers in said curve segment when said drive disc is rotated;
- said drive disc being positioned for rotation within a horizontal plane and supported therein by at least one idler wheel and a drive wheel, said idler wheel and said drive wheel retaining said edge member against the bottom surface of said driven rollers in said curve segment to drive said rollers when said drive disc is rotated within said horizontal plane by said drive wheel, said drive disc being drivingly associated with a third drive shaft, said third drive shaft being operatively associated with said first drive shaft and said second drive shafts such that rotation of any one of said drive shafts also drives the remaining two said drive shafts;
- a drive motor operatively associated with each of said first drive shaft, said second drive shaft and said drive disc to thereby drive each of said first segment, said second segment and said curve segment.

23. The curve of claim 22 wherein said first drive shaft includes a plurality of pulley members axially positioned therealong, each said pulley member being associated with one of said driven conveyor rollers along said first segment, each said conveyor roller and pulley member having an elastomeric O-belt reeved therearound to retain said pulley member in frictional contact with said first drive shaft for driving said conveyor roller when said first drive shaft is rotated.

24. The curve of claim 22 wherein said second drive shaft includes a plurality of pulley members axially positioned therealong, each said pulley member being associated with one of said driven conveyor rollers along said second segment, each said conveyor roller and pulley member having an elastomeric O-belt reeved therearound to retain said pulley member in frictional contact with said second drive shaft for driving said conveyor roller when said second drive shaft is rotated.

* * * * *